US009134891B1

(12) United States Patent
Schultz et al.

(10) Patent No.: US 9,134,891 B1
(45) Date of Patent: Sep. 15, 2015

(54) FORMAT AND DISPLAY CONFIGURATION SELECTION OF A DISPLAY DEVICE

(75) Inventors: Bryan C. Schultz, Marion, IA (US); Colin D. Reed, Cedar Rapids, IA (US); David L. Leedom, Center Point, IA (US); David A. Gribble, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 881 days.

(21) Appl. No.: 13/240,677

(22) Filed: Sep. 22, 2011

(51) Int. Cl.
*G06F 3/048* (2013.01)
*G06F 3/0486* (2013.01)
*G06F 9/44* (2006.01)
*G06F 3/0481* (2013.01)

(52) U.S. Cl.
CPC ............ *G06F 3/0486* (2013.01); *G06F 3/0481* (2013.01); *G06F 9/4443* (2013.01)

(58) Field of Classification Search
CPC .... G06F 3/0486; G06F 3/0481; G06F 9/4443
USPC ........................................................ 715/769
See application file for complete search history.

(56) References Cited

U.S. PATENT DOCUMENTS

| | | | | |
|---|---|---|---|---|
| 7,124,360 B1* | 10/2006 | Drenttel et al. | ............... | 715/205 |
| 7,209,149 B2* | 4/2007 | Jogo | ............................. | 345/622 |
| 7,839,512 B2* | 11/2010 | Kotani et al. | ................ | 358/1.13 |
| 8,743,411 B2* | 6/2014 | Bachman et al. | ............. | 358/1.18 |
| 2005/0243381 A1* | 11/2005 | Hill et al. | ....................... | 358/453 |
| 2007/0245236 A1* | 10/2007 | Lee | ................................. | 715/530 |
| 2008/0222560 A1* | 9/2008 | Harrison | ....................... | 715/800 |
| 2008/0313533 A1* | 12/2008 | Hoyer et al. | ................... | 715/243 |
| 2009/0282352 A1* | 11/2009 | Solanki et al. | ................. | 715/765 |
| 2010/0295777 A1* | 11/2010 | Detouillon | .................... | 345/157 |
| 2011/0234518 A1* | 9/2011 | Maruyama | .................... | 345/173 |
| 2011/0283242 A1* | 11/2011 | Chew et al. | .................... | 715/863 |
| 2013/0086468 A1* | 4/2013 | Rosner et al. | ................. | 715/243 |

* cited by examiner

*Primary Examiner* — Anil Bhargava
(74) *Attorney, Agent, or Firm* — Angel N. Gerdzhikov; Donna P. Suchy; Daniel M. Barbieri

(57) ABSTRACT

An apparatus for providing format and display configuration selection includes a display device, a user interface device, and a computer control system communicatively coupled to the display device and the user interface device, wherein the computer control system is configured to initiate a display format selection menu in a display area of the display device, wherein the display format selection menu includes an application menu area, a display configuration area, and an application configuration preview area, select an application from the application menu area, select a display configuration from the display configuration area, generate a multi-application display preview by displaying the one or more selected applications in a configuration defined by the selected display configuration in the application preview area, and implement the previewed multi-application display in response to a signal received from the user interface device indicative of acceptance of the previewed multi-application display.

21 Claims, 7 Drawing Sheets

FORMAT AND DISPLAY CONFIGURATION SELECTION OF A DISPLAY DEVICE

TECHNICAL FIELD

The present invention generally relates to the formatting and configuration of display devices, and more particularly to a system and method for providing format and display configuration selection of display devices for avionics systems.

BACKGROUND

Current avionics graphical display systems often suffer from difficulties in format selection, which is often cumbersome and unintuitive. In addition, current practices often result in unanticipated display configurations. Unexpected display configurations often result from format limitations and format stealing logic, among other factors. The various factors combine to create a complex and difficult to implement format selection process. As such, it is desirable to provide an intuitive and simplified method for display format selection, which allows for quick and straightforward display selection and configuration.

SUMMARY

An apparatus for providing format and display configuration selection of a display device is disclosed. In one aspect, the apparatus may include, but is not limited to, a display device, wherein the display device includes at least one display area; a user interface device; and a computer control system communicatively coupled to the display device and the user interface device, wherein the computer control system is configured to: initiate a display format selection menu in the display area of the display device in response to a signal received from the user interface device indicative of a user request to initiate the display format selection menu, wherein the display format selection menu includes an application menu area, a display configuration area, and an application configuration preview area; select one or more applications from the application menu area of the display format selection menu for display in a multi-application display of the at least one display area of the display device; select a display configuration for the multi-application display from the display configuration area of the display format selection menu; generate a multi-application display preview by displaying the one or more selected applications in a configuration defined by the selected display configuration in the application preview area of the display format selection menu; implement the previewed multi-application display by displaying the one or more selected applications in the configuration defined by the selected display configuration in the at least one display area of the display device in response to a signal received from the user interface device indicative of acceptance of the previewed multi-application display.

A method for providing format and display configuration selection of a display device is disclosed. In one aspect, the method may include, but is not limited to, providing a display device, wherein the display device includes at least one display area, wherein the display device is responsive to one or more user interface devices; initiating a display format selection menu in the at least one display area of the display device, wherein the display format selection menu includes an application menu area, a display configuration area, and a configuration preview area; selecting one or more applications from the application menu area of the display format selection menu for display in a multi-application display of the at least one display area of the display device; selecting a display configuration from the display configuration area of the display format selection menu for utilization in the multi-application display; and generating a multi-application display preview by displaying the one or more selected applications in a configuration defined by the selected display configuration in the application preview area of the display format selection menu. The method further including implementing the previewed multi-application display by displaying the one or more selected applications in the configuration defined by the selected display configuration in the at least one display area of the display device in response to a signal received from the user interface device indicative of acceptance of the previewed multi-application display.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. Reference will now be made in detail to the subject matter disclosed, which is illustrated in the accompanying drawings.

Referring generally to FIG. 1A through 5, a system 100 for providing format and display configuration selection of a display device is described in accordance with the present disclosure. The present invention is directed toward a method and system suitable for providing an intuitive and simplified method for avionics display format selection, allowing for quick and straightforward display selection and configuration.

Figure 1A:
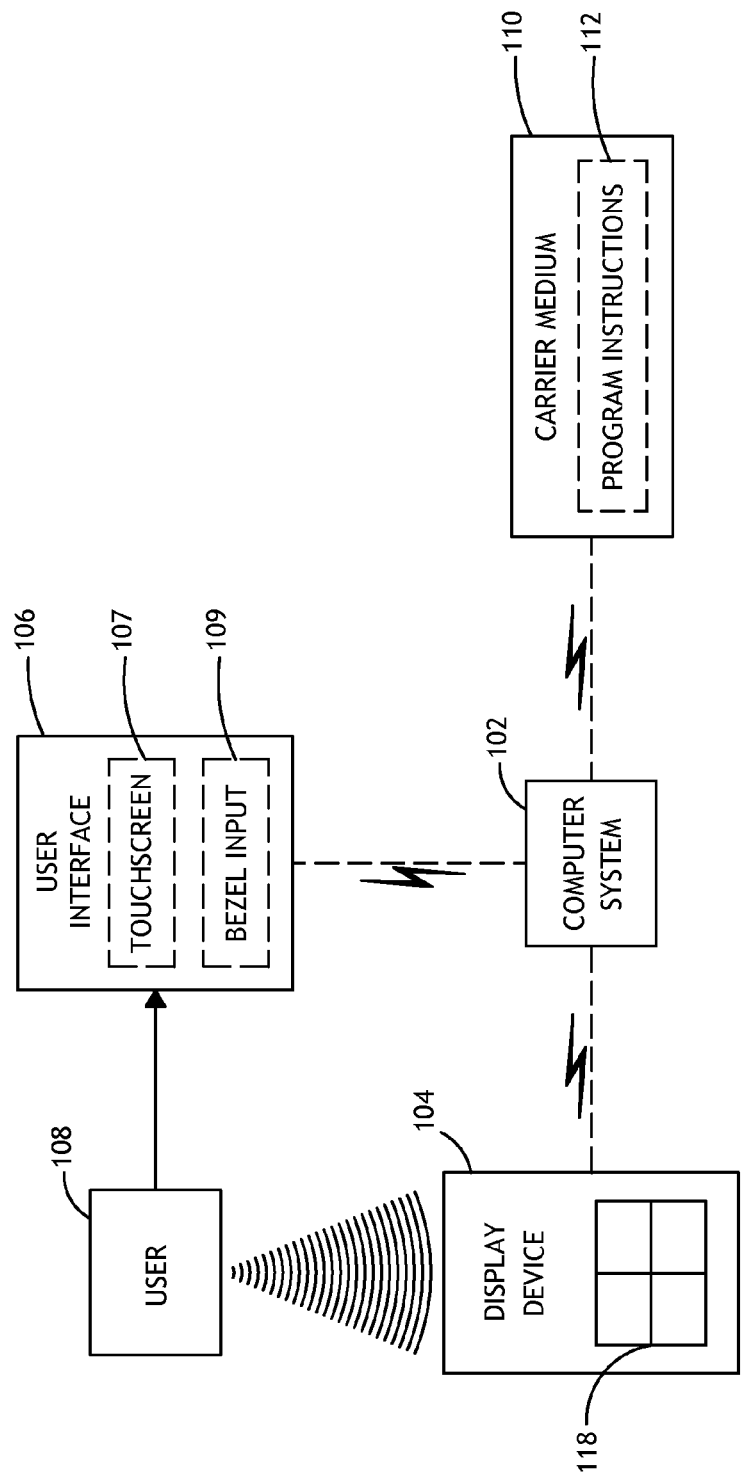
FIG. 1A is a block diagram view of a system for providing format and display configuration selection of a display device, in accordance with one embodiment of the present invention.

FIG. 1A illustrates a block diagram view of the system 100 for providing format and display configuration selection of a display device, in accordance with one embodiment of the present invention. The system 100 may include a computer system 102, a display device 104 communicatively coupled to the computer system 102, and a user interface 106 (e.g., touchscreen interface 107 or bezel mounted interface 109) communicatively coupled to the computer system 102.

The display device 104 may include any display device known in the art. For example, the display device 104 may include, but is not limited to, a liquid crystal display (LCD). In another example, the display device 104 may include, but is not limited to, an organic light-emitting diode (OLED) based display. Those skilled in the art should recognize that a variety of display devices may be suitable for implementation in the present invention and the particular choice of display device may depend on a variety of factors, including, but not limited to, form factor, cost, power demands, and the like. In a general sense, any display device capable of integrating a touchscreen or bezel mounted interface is suitable for implementation in the present invention.

The user interface 106 may include any user interface known in the art. In one embodiment, the user interface may include, but is not limited to, a touchscreen interface 107. Those skilled in the art should recognize that a large number of touchscreen interface devices may be suitable for implementation in the present invention. For instance, the display device 104 may be equipped with a touchscreen interface 107, such as, but not limited to, a capacitive touchscreen, a resistive touchscreen, a surface acoustic based touchscreen, an infrared based touchscreen, or the like. In a general sense, any touchscreen interface capable of integration with the display portion of the display device 104 is suitable for implementation in the present invention. In another embodiment, the user interface may include, but is not limited to, a bezel mounted interface 109. For example, the display device 104 may include a bezel equipped with one or more bezel mounted interfaces 109. For instance, the bezel mounted interface 109 may include, but is not limited to, a hard key 114 (or hard "button") disposed on the bezel 117 of the display device 104. In a general sense, any bezel mounted interface capable of integration with the display device 104 is suitable for implementation in the present invention. Further, it should be recognized that a wide variety of user interface devices may be suitable for implementation in the present invention. For example, in addition to a touchscreen interface 107 or a bezel interface 109, the user interface 106 may include, but is not limited to, a lever, a knob, a scroll wheel, a track ball, a switch, a dial, a sliding bar, a scroll bar, a slide, a handle, a touch pad, a paddle, a steering wheel, a keyboard, a keypad, a joystick, or the like.

In one aspect, the system 100 may be configured to initiate or "launch" a display format selection menu 200 in a display area of the display device 104. In one embodiment, the computer system 102 of the system 100 may be configured to launch the display format selection menu 200 within a display area of the display device 104 in response to a signal received from the user interface 106. For example, a user 108 may input information into the computer system 102 via the user interface 106, such as, but not limited to, a touchscreen 107 or bezel mounted input 109. Then, the user interface 106 may transmit a signal to the computer system 102 indicative of a user inputted request to launch the display format selection menu 200.

Figure 1B:
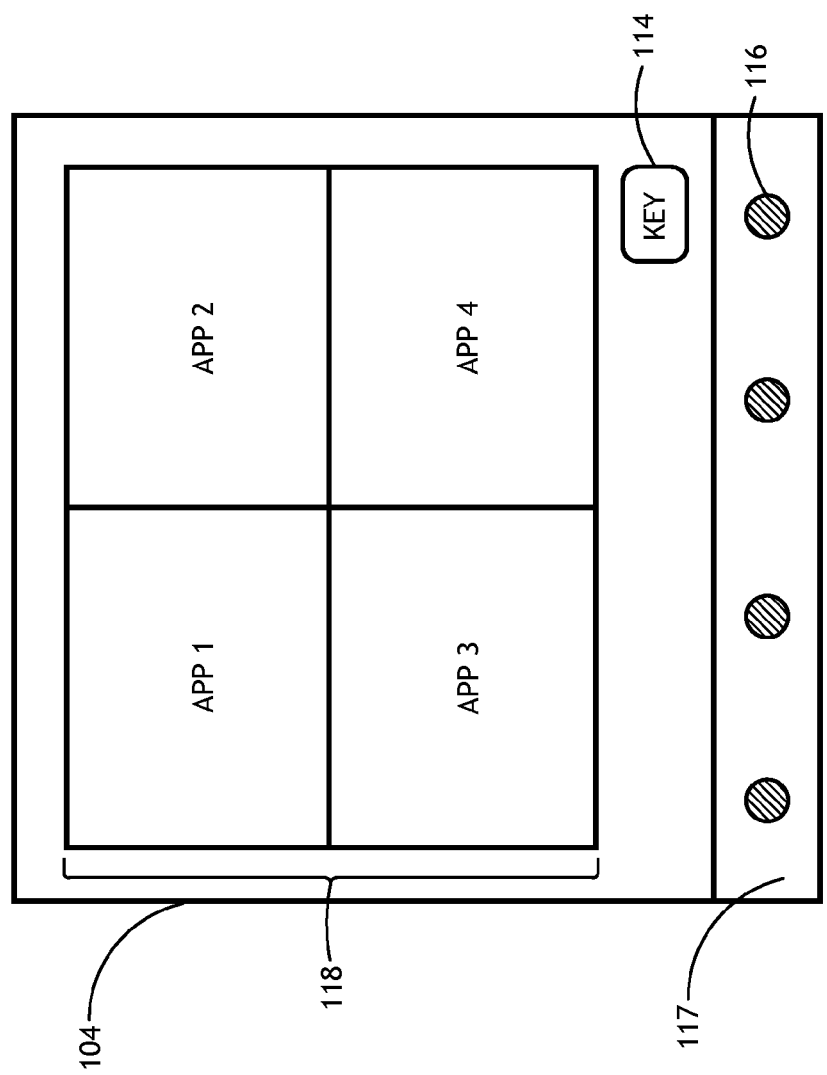
FIG. 1B is a schematic view of a display device with a display area having a multi-application display, in accordance with one embodiment of the present invention.

FIG. 1B illustrates a multi-application display 118 of a display device 104, in accordance with one embodiment of the present invention. In one aspect, the multi-application display 118 is configured to display multiple applications running simultaneously on a single display area of the display device 104. For example, as shown in FIG. 1B, the multi-application display 118 simultaneously displays a first application APP1, a second application APP2, a third application APP3, and a fourth application APP4. Those skilled in the art should recognize that the above configuration and number of applications running on the multi-application display 118 is not a limitation, but should merely be interpreted as an illustration. In a general sense, any number of applications may run on the multi-application display 118 in any number of geometrical arrangements.

In one embodiment, the multi-application display 118 of the display device 104 may include a soft key 114 configured to receive a user input and subsequently provide a menu launch request signal to the computer system 102. For example, the user 108 may press or tap the soft key 114 in order to initiate (or launch) the display format selection menu 200. After receiving this request, the computer system 102 may launch the display format selection menu 200 in a display area of the display device 104. Those skilled in the art should recognize that user feedback may be inputted using the soft key 114 in a variety of ways. For example, the computer system 102 may be configured to launch the menu 200 in response to a single tap. Additional feedback mechanisms may include, but are not limited to, a double tap, a press and hold for a selected amount of time, or a slide motion. In another embodiment, the multi-application display 118 of the display device 104 may include a hard key 116 mounted on the bezel 117 of the display device 104 configured to receive user input and further configured to subsequently provide a menu launch request signal to the computer system 102. For example, the user 108 may press or tap the hard key 116 in order to initiate the display format selection menu 200. After receiving this request, the computer system 102 may launch the display format selection menu 200 in a display area of the display device 104. Those skilled in the art should recognize that user feedback may be inputted using the hard key 116 in a variety of ways. For example, the computer system 102 may be configured to launch the menu 200 in response to a single press of the hard key 116. Additional feedback mechanisms may include, but are not limited to, a multiple hard key press, a press and hold for a selected amount of time of the hard key. Further, the hardware based user interface may include a slidable input device, which is configured to launch the menu 200 in response to a user sliding a slidable switch to a chosen location.

Figure 2:
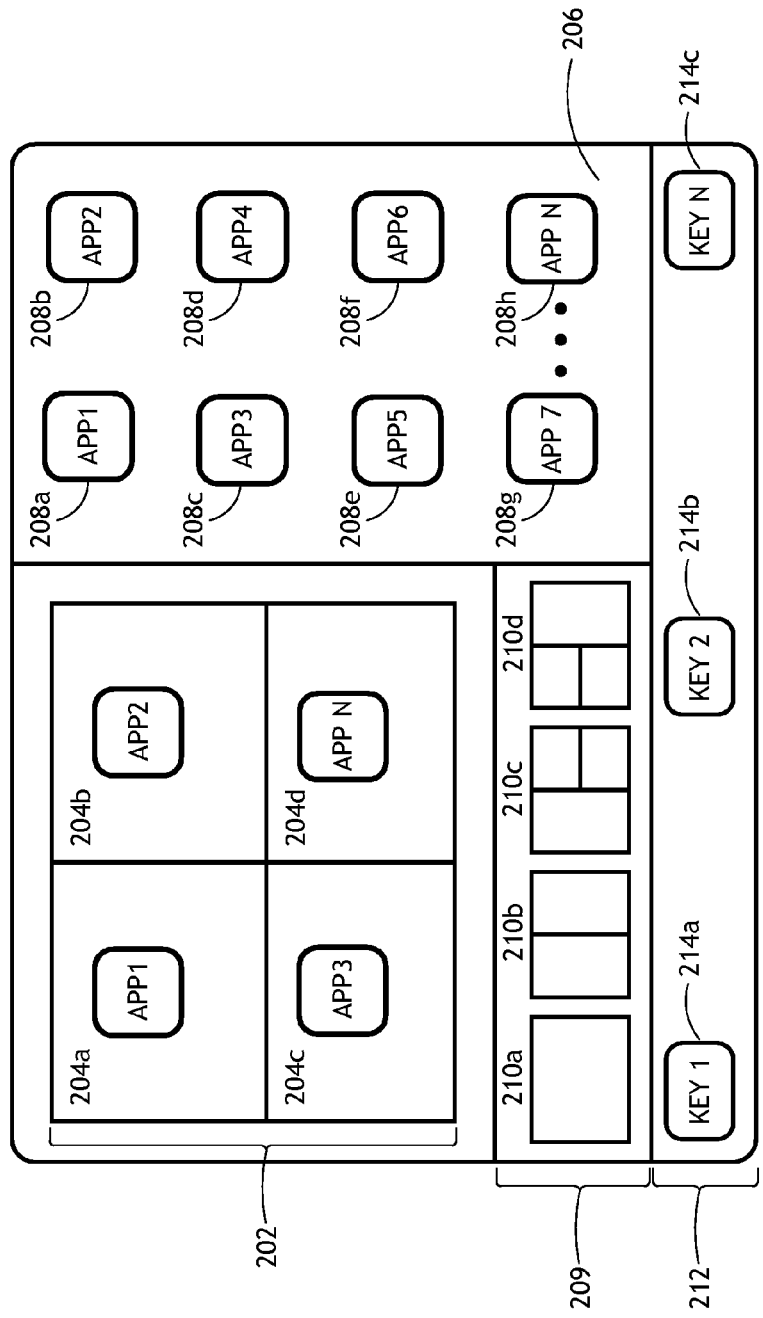
FIG. 2 is a schematic view of a display format selection menu, in accordance with one embodiment of the present invention.

FIG. 2 illustrates a schematic view of the display format selection menu 200, in accordance with one embodiment of the present invention. The display format selection menu 200 may include an application configuration preview area 202, an application menu area 206, a display configuration area 209, and an auxiliary menu area 212.

In another aspect of the present invention, the application menu area 206 may include one or more available applications suitable for use in the multi-application display 118 of the display device 104. For example, the application menu area 206 may display APP1, APP2, APP3, APP4, APP5, APP6, APP7, and up to and including an Nth application, APP N, labeled as 208a through 208h respectively. In one embodiment, the system 100 may be configured to select one or more applications from the application menu area 206 of the display format selection menu 200. For example, in response to a signal from a user interface 106, the computer system 102 may select one or more applications from the application menu area 206 for display in the application configuration preview area 202. For example, the user may select APP1, APP2, APP3, and APPN via a user interface 106, such as a touchscreen 107 or bezel mounted interface 109. Applicant notes, however, that the selected applications from the application area 206 do not automatically appear in the multi-application display 118. The present invention is directed to a menu 200 including an application preview area 202, discussed in greater detail further herein, which allows a user to preview the selected applications and the configuration of the applications prior to implementation in the full multi-application display 118.

Those skilled in the art should recognize that the applications APP1 . . . APPN of the application menu area 206 may be selected in any manner known in the art. In one embodiment, the applications APP1 . . . APPN of the application menu area 206 may be selected utilizing a drag and drop function. In this regard, an application (e.g., APP1 . . . APPN) may be selected by dragging the application to the application configuration preview menu 202 and dropping the application on the application configuration preview area 202 utilizing a touchscreen interface 107 of the display device 104. This process can be repeated until all of the desired applications are selected for preview in the application configuration preview menu 202. It should be recognized by those skilled in the art that the process of dragging and dropping the graphical representation of a particular application from the application menu 206 to the application configuration area 202 signals the computer 102 to select the particular application for graphical display in the application configuration preview area 202.

In another embodiment, the applications APP1 . . . APPN of the application menu area 206 may be selected utilizing a tap or press function. In this regard, an application (e.g., APP1 . . . APPN) may be selected by a user 108 by tapping (or "pressing") the graphical representation of the application in the application menu area 206. For example, utilizing a touchscreen interface 107 of the display device 104 a user may "tap" or "press" a particular application (e.g., APP1 . . . APPN) for display in the application configuration preview area 202. In a further embodiment, the selection of a particular application may be triggered by a single tap or a double tap. By way of another example, utilizing a bezel mounted interface 109 (e.g., bezel mounted hardware key) of the display device 104 a user may "tap" or "press" a hardware key in order to select a particular application (e.g., APP1 . . . APPN) for display in the application configuration preview area 202.

In another embodiment, the selection of a particular application may be triggered by pressing and holding the particular application for a selected amount of time (e.g., 2 seconds). This process can be repeated until all of the desired applications are selected for preview in the application configuration preview menu 202. It should be recognized by those skilled in the art that the process of tapping or pressing the graphical representation of a particular application found in the application menu 206 signals the computer 102 to select the particular application for graphical display in the application configuration preview area 202. It should further be recognized that the pressing and holding function may be implemented utilizing a touchscreen interface equipped with soft keys or a bezel mounted interface equipped with hardware keys.

In a general sense, the computer system 102 may be configured to select one or more applications from the application menu area 206 for display in the application configuration area 202 of the display format selection menu 200 in response to a signal from a user interface (e.g., touchscreen or bezel mounted interface) indicative of user selection (e.g., drag and drop motion, tap motion, press motion, press and hold motion, or the like) of the one or more applications.

In another aspect of the present invention, the display configuration area 209 may include one or more available display configurations suitable for use in the multi-application display 118 of the display device 104. For example, as shown in FIG. 2, the display configuration area 209 may include display configurations 210*a*, 210*b*, 210*c*, or 210*d*. For instance, display configuration 210*a* includes a full screen display configuration suitable for displaying a single application in the multi-application display 118 of display device 104. Display configuration 210*b* includes a two-way screen display configuration suitable for displaying two applications in the multi-application display 118 of display device 104. Display configuration 210*c* includes a three-way screen display configuration suitable for displaying three applications in the multi-application display 118 of display device 104. It is noted that configuration 210*c* is suitable for displaying a half screen on the left side of the multi-application display 118 and two quarter screen on the right side of the multi-application display 118. Display configuration 210*d* includes an alternate three-way screen display configuration suitable for displaying three applications in the multi-application display 118 of display device 104. It is noted that configuration 210*d* is suitable for displaying a half screen on the right side of the multi-application display 118 and two quarter screens on the left side of the multi-application display 118. It is further noted that that display configuration area 209 may include a four-way display configuration (not shown in display configuration area 209) suitable for simultaneously displaying four applications in the multi-application display 118 of the display device 104. An example of a four-way display configuration is illustrated in the application configuration preview area 202 of FIG. 2. It is noted that the four-way configuration of the preview area 202 is suitable for displaying four quarter screens on the multi-application display 118, with each of the four applications designated for one of the four areas of the quartered multi-application display 118 of the display device 104.

In one embodiment, the system 100 may be configured to select a display configuration for the multi-application display 118 from the display configuration area 209 of the display format selection menu 200. For example, in response to a signal from a user interface 106, the computer system 102 may select a display configuration (e.g., 210*a* . . . 210*d*) from the display configuration area 209, wherein the selected display configuration is utilized by the system 100 to configure the geometrical arrangement of the multiple applications running in the multi-application display 118 of the display device 104. For instance, the user may select one of the configurations 210*a*, 210*b*, 210*c*, 210*d*, or like configurations via a user interface 106, such as a touchscreen 107 or bezel mounted interface 109. Applicant again notes, however, that the selected display configuration is not automatically applied to the multi-application display 118. The present invention is directed to a menu 200 including an application preview area 202, discussed in greater detail further herein, which allows a user to preview the selected applications arranged in the selected configuration from display area 209 prior to implementation in the full sized multi-application display 118.

Those skilled in the art should recognize that one or more of the configurations of the display configuration area 209 may be selected in any manner known in the art. It should be recognized by those skilled in the art that the methods for selection (e.g., tap function or drag and drop function) using a touchscreen 107 or bezel mounted interface 109 described above with respect to selection of applications from the application menu 206 should be interpreted to extend to the selection of a particular display configuration (e.g., 210 . . . 210*d*) of the display configuration area 209.

In another aspect of the present invention, the application configuration preview area 202 may include a preview of a multi-application display 118. In this regard, a preview of the selected applications arranged according to the selected display configuration may be generated by the computer system 102 of the system 100 and displayed on the display device 104 prior to implementation. This function allows for the generation of an accurate preview of the multi-application display 118 prior to changing a current configuration of the multi-application display 118. In one embodiment, the application configuration preview area 202 may display a four screen configuration including APP1 204*a*, APP2 204*b*, APP3, and up to and including APPN 204*d*, as shown in FIG. 2. It should be recognized that the applications and four screen configuration depicted in the application configuration preview area 202 of FIG. 2 should not be interpreted as limiting but rather merely as illustrative.

In another aspect of the present invention, the auxiliary menu area 212 of the display format selection menu 200 may include one or more soft keys suitable for providing one or more signal to the computer system 102 for carrying out various functions of the system 100. In one embodiment, the auxiliary menu area 212 of the display format selection menu 200 may include the soft keys KEY1 214*a*, KEY2 214*b*, and up to and including KEY N 214*c*. It should be recognized that the soft keys of the auxiliary menu area 212 may be devoted to a variety of functions, such as, but not limited to, acceptance/implementation of a previewed application configuration, rejection of a previewed application configuration, or termination of the display format selection menu 200.

In another aspect of the present invention, the system 100 may be configured to implement the previewed configuration depicted in the application configuration preview area 202 in response to a signal indicative of user acceptance of the previewed application configuration transmitted from the user interface 106. For example, a soft key (e.g., KEY1 or KEY N) of the auxiliary menu area 212 of the display format selection menu 200 may be devoted to accepting the previewed configuration displayed in application configuration area 202. By way of another example, a hard key mounted on the bezel of the display device 104 may be devoted to accepting the previewed configuration displayed in application configuration area 202. Upon acceptance of a previewed configuration displayed in the application configuration preview area 202, via a soft key of auxiliary menu 212 or a hard key mounted on bezel, a user 108 may initiate implementation of the previewed application configuration. In this sense, the user interface 106 may transmit a signal indicative of user acceptance of the previewed application configuration displayed in application configuration area 202 to the computer system 102. The computer system 102 may then implement the previewed application configuration of area 202 as the full sized multi-application display 118.

Similarly, the user interface 106 may transmit a signal indicative of user rejection of the previewed application configuration displayed in the application configuration area 202 to the computer system 102. The computer system 102 may then cancel or reject the previewed application configuration of area 202 as the full sized multi-application display.

Figure 3:
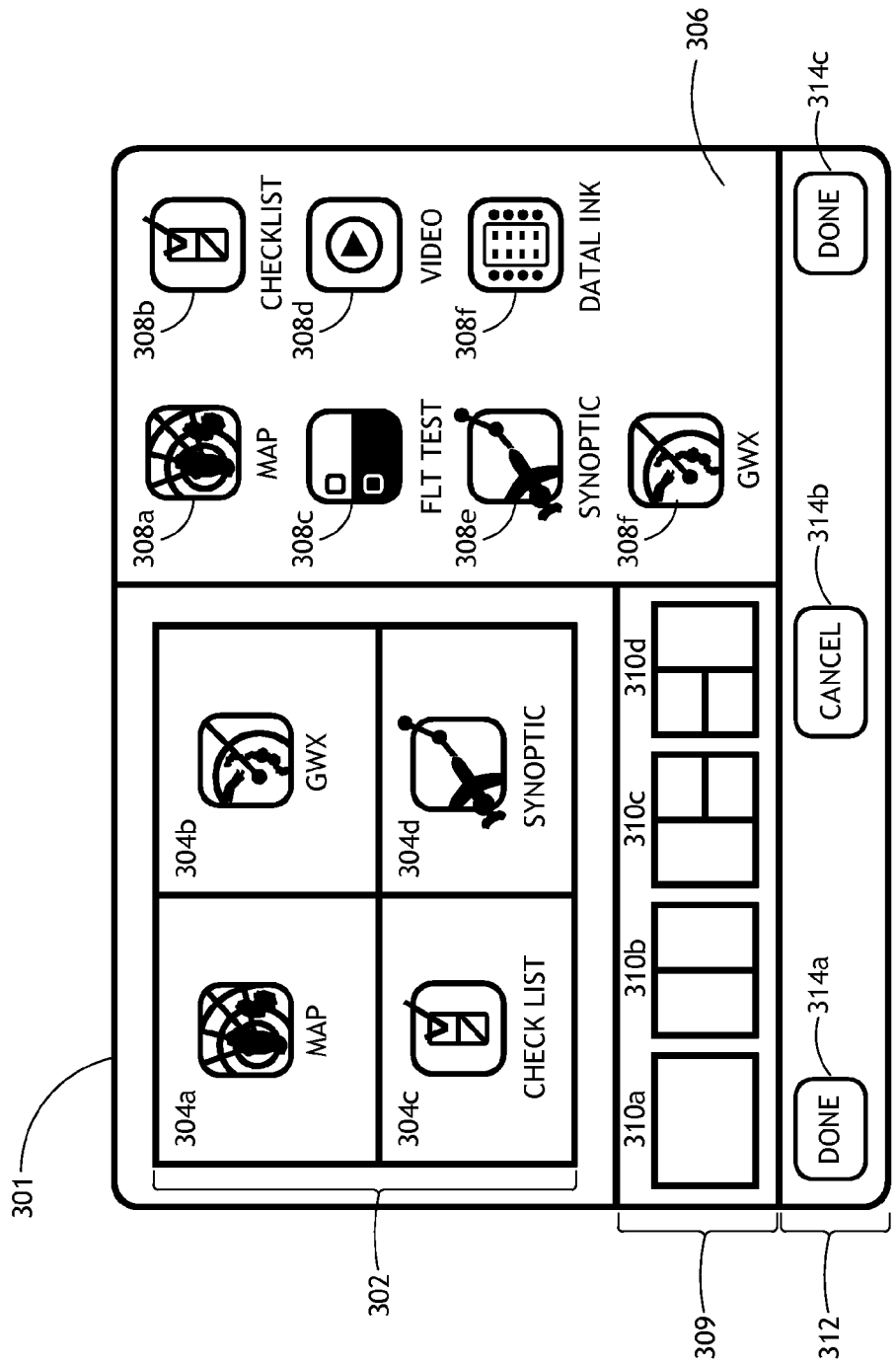
FIG. 3 is a schematic view of a display format selection menu, in accordance with one embodiment of the present invention.

FIG. 3 illustrates a display format selection menu 300, in accordance with an embodiment of the present invention. The application menu 306 of the display format selection menu 300 may include the following applications: MAP 308*a*, Checklist 308*b*, Flight Test 308*c*, Video 308*d*, Synoptic 308*e*, Data Link 308*f*, and GWX 308*f*. The display configuration area 309 may include a single panel configuration 310*a*, a two panel configuration 310*b*, a first three panel configuration 310*c*, a second three panel configuration 310*d*, and a four panel configuration (not shown). As described previously herein, the applications of the application menu 306 may be selected via a user interface and displayed in an application configuration preview area 302 in a manner consistent with a selected configuration from the display configuration area 309. As depicted in FIG. 3, the application configuration preview area 302 of the display format selection menu 300 includes the applications MAP 304*a*, GWX 304*b*, Check List 304*c*, and Synoptic 304*d* arranged in a four panel application configuration. Moreover, the previewed application configuration displayed in the application configuration preview area 302 may be implemented via user input through the "Done" soft keys of the auxiliary menu 312, as discussed in greater detail previously herein. Further, the previewed application configuration displayed in the application configuration preview area 302 may be canceled or rejected via user input through the "Cancel" soft key of the auxiliary menu 312, as discussed in greater detail previously herein. Those skilled in the art should recognize that the set of applications and the arrangement described above should not be interpreted as limiting, but rather merely represents one embodiment of the present invention.

Figure 4:
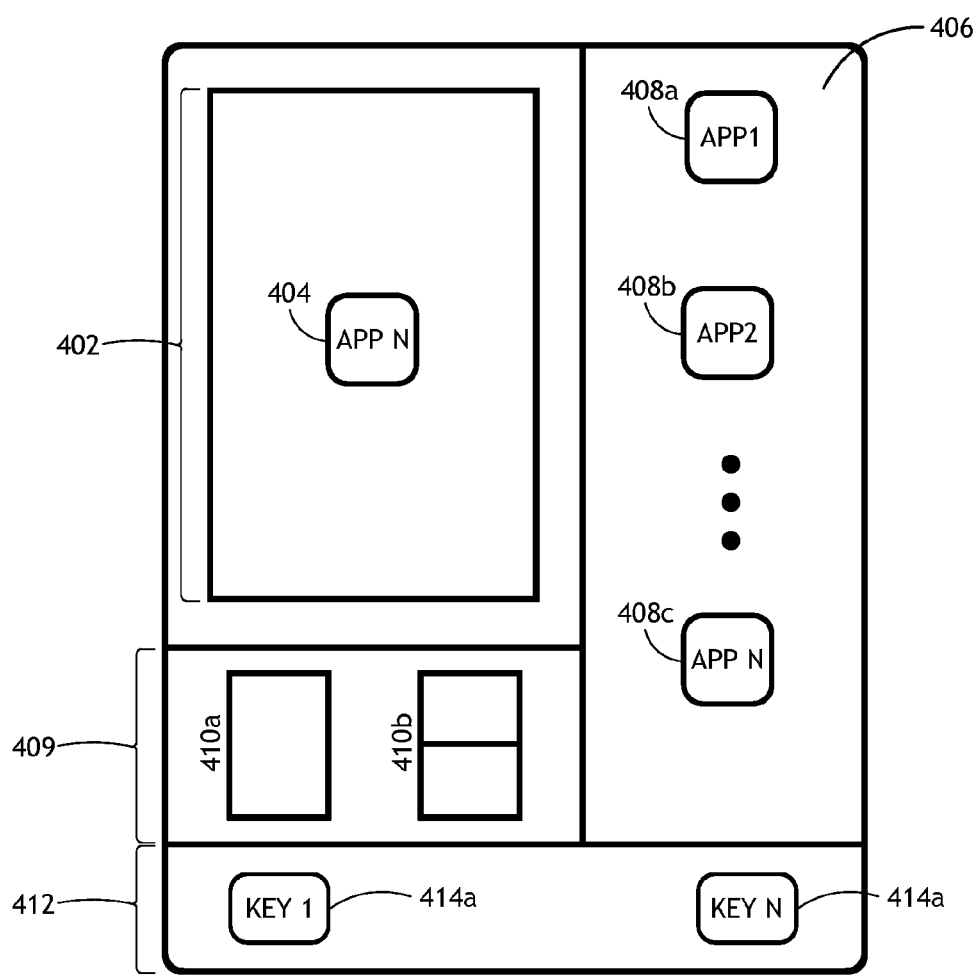
FIG. 4 is a schematic view of a display format selection menu, in accordance with one embodiment of the present invention.

FIG. 4 illustrates a simplified display format selection menu 400, in accordance with an embodiment of the present invention. The application menu 406 of the simplified display format selection menu 400 may include the applications APP1 408*a*, APP2 408B, and up to and including APPN 408*c*. The display configuration area 409 may include a single panel configuration 410*a* and a two panel configuration 410*b*. As described previously herein, the applications of the application menu 406 may be selected via a user interface and displayed in an application configuration preview area 402 in a manner consistent with the selected configuration from the display configuration area 409. As depicted in FIG. 4, the application configuration preview area 402 of the display format selection menu 400 includes a single application APP N 404. Moreover, the previewed application configuration displayed in the application configuration preview area 402 may be implemented via user input via one or more of soft keys (e.g., KEY 1 414*a* or KEY 2 414*b*) of the auxiliary menu 412, in a manner similar to that described with respect to menu 200. Further, the previewed application configuration displayed in the application configuration preview area 402 may be canceled or rejected via user input through one or more of the soft keys of the auxiliary menu 412. Those skilled in the art should recognize that the set of applications and the arrangement described above should not be interpreted as limiting, but rather merely represents one embodiment of the present invention.

It is contemplated herein that the simplified display format selection menu 400 of FIG. 4 may be particularly advantageous in settings where only a portion of the display device 104 is available for utilization by the multi-application display 118. In these settings, the simplified display format selection menu 400 may be implemented such that only a portion of the display device is used by the simplified display format selection menu 400.

FIG. 4 illustrates a simplified display format selection menu 400, in accordance with an embodiment of the present invention. The application menu 406 of the simplified display format selection menu 400 may include the applications APP1 408*a*, APP2 408B, and up to and including APPN 408*c*. The display configuration area 409 may include a single panel configuration 410*a* and a two panel configuration 410*b*. As described previously herein, the applications of the application menu 406 may be selected via a user interface and displayed in an application configuration preview area 402 in a manner consistent with the selected configuration from the display configuration area 409. As depicted in FIG. 4, the application configuration preview area 402 of the display format selection menu 400 includes a single application APP N 404. Moreover, the previewed application configuration displayed in the application configuration preview area 402 may be implemented via user input via one or more of soft keys (e.g., KEY 1 414*a* or KEY 2 414*b*) of the auxiliary menu 412, in a manner similar to that described with respect to menu 200. Further, the previewed application configuration displayed in the application configuration preview area 402 may be canceled or rejected via user input through one or more of the soft keys of the auxiliary menu 412. Those skilled in the art should recognize that the set of applications and the arrangement described above should not be interpreted as limiting, but rather merely represents one embodiment of the present invention.

It is contemplated herein that the simplified display format selection menu 400 of FIG. 4 may be particularly advantageous in settings where only a portion of the display device 104 is available for utilization by the multi-application display 118. In these settings, the simplified display format selection menu 400 may be implemented such that only a portion of the display device is used by the simplified display format selection menu 400.

FIG. 4 illustrates a simplified display format selection menu 400, in accordance with an embodiment of the present invention. The application menu 406 of the simplified display format selection menu 400 may include the applications APP1 408*a*, APP2 408B, and up to and including APPN 408*c*. The display configuration area 409 may include a single panel configuration 410*a* and a two panel configuration 410*b*. As described previously herein, the applications of the application menu 406 may be selected via a user interface and displayed in an application configuration preview area 402 in a manner consistent with the selected configuration from the display configuration area 409. As depicted in FIG. 4, the application configuration preview area 402 of the display format selection menu 400 includes a single application APP N 404. Moreover, the previewed application configuration displayed in the application configuration preview area 402 may be implemented via user input via one or more of soft keys (e.g., KEY 1 414*a* or KEY 2 414*b*) of the auxiliary menu 412, in a manner similar to that described with respect to menu 200. Further, the previewed application configuration displayed in the application configuration preview area 402 may be canceled or rejected via user input through one or more of the soft keys of the auxiliary menu 412. Those skilled in the art should recognize that the set of applications and the arrangement described above should not be interpreted as limiting, but rather merely represents one embodiment of the present invention.

It is contemplated herein that the simplified display format selection menu 400 of FIG. 4 may be particularly advantageous in settings where only a portion of the display device 104 is available for utilization by the multi-application display 118. In these settings, the simplified display format selection menu 400 may be implemented such that only a portion of the display device is used by the simplified display format selection menu 400.

Figure 5:
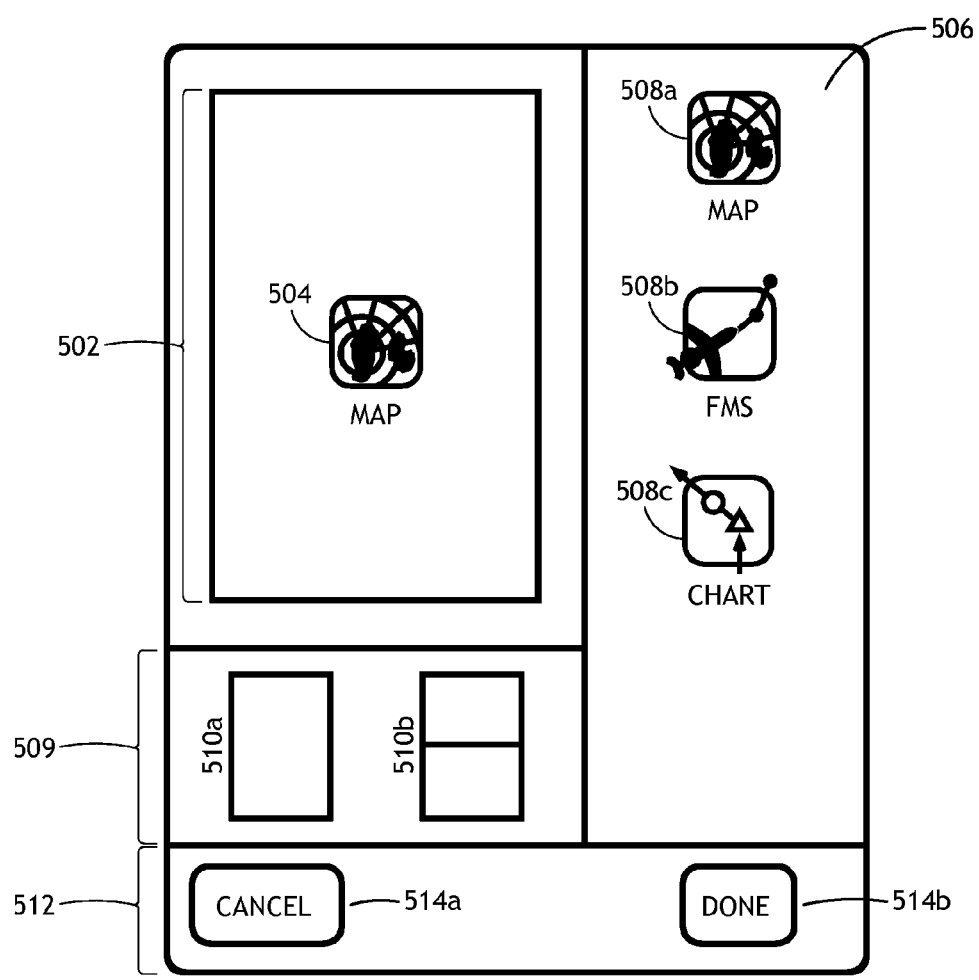
FIG. 5 is a schematic view of a display format selection menu, in accordance with one embodiment of the present invention.

FIG. 5 illustrates a simplified display format selection menu 500, in accordance with one embodiment of the present invention. The application menu 506 of the simplified display format selection menu 500 may include the applications MAP 508*a*, FMS 508*b*, and Chart 508*c*. The display configuration area 509 may include a single panel configuration 510*a* and a two panel configuration 510*b*. As described previously herein, the applications of the application menu 506 may be selected via a user interface and displayed in an application configuration preview area 502 in a manner consistent with the selected configuration from the display configuration area 509. As depicted in FIG. 5, the application configuration preview area 502 of the display format selection menu 500 includes a single application MAP 504. Further, the previewed application configuration displayed in the application configuration preview area 502 may be implemented (as full scale multi-application window) through user input via one or more soft "Done" keys 514*b* of the auxiliary menu 512, in a manner similar to that described with respect to FIGS. 200 and 300. Further, the previewed application configuration displayed in the application configuration preview area 502 may be canceled or rejected via user input through one or more of the "Cancel" soft keys of the auxiliary menu 512. Those skilled in the art should recognize that the set of applications and the arrangement described above should not be interpreted as limiting, but rather merely as one embodiment of the present invention.

Figure 6:
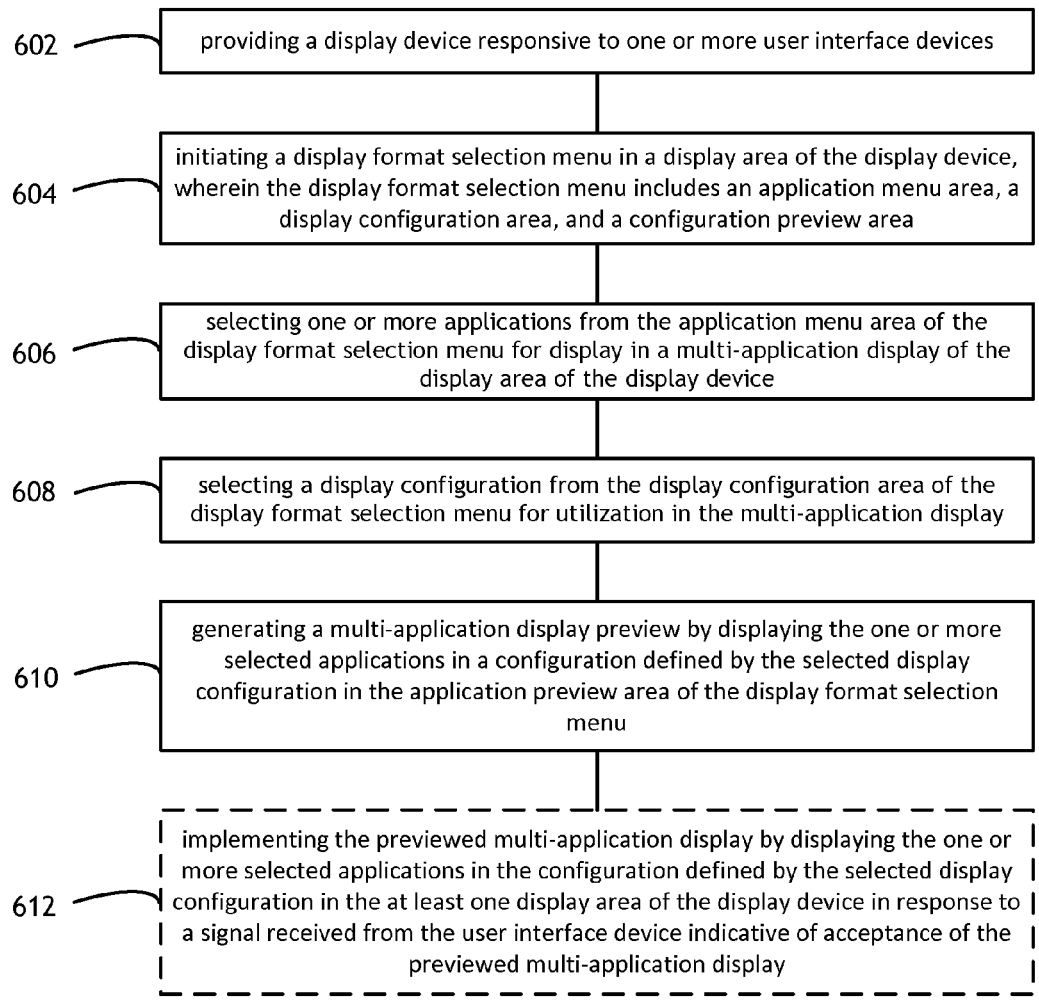
FIG. 6 is a flow chart illustrating a method for providing format and display configuration selection of a display device.

FIG. 6 illustrates a method 600 for providing format and display configuration selection of a display device is described in accordance with the present disclosure. In step 602, a display device responsive to one or more user interface devices is provided. The display device may include any suitable display device known in the art, such as, but not limited to, a LCD or an OLED display. In step 604, a display format selection menu may be initiated or "launched" in a display area of a display device. In one aspect, the display formation selection menu may include an application menu area, a display configuration area, an application configuration area, and an auxiliary menu. In another aspect, the display format selection menu may be initiated or launched in response to a signal received from a user interface device, such as a touchscreen device 107 or a bezel mounted input device 109. In step 606, one or more applications from the application menu area of the display format selection menu may be selected for display in a multi-application display of the display area of the display device. In step 608, a display configuration from the display configuration area of the display format selection menu may be selected for utilization in the multi-application display. In step 610, a multi-application display preview may be generating by displaying the selected applications in a configuration defined by the selected display configuration in the application preview area of the display formation selection menu. In a further step 612, the previewed multi-application display may be implemented by displaying the one or more selected applications in the configuration defined by the selected display configuration in the at least one display area of the display device in response to a signal received from the user interface device indicative of acceptance of the previewed multi-application display.

It should be recognized that the steps described throughout the present disclosure may be carried out by a single computer system or, alternatively, a multiple computer systems. Moreover, different subsystems of the system 100, such as the display device 104 or the user interface device 106, may include a computer system or logic elements suitable for carrying out at least a portion of the steps described throughout the present disclosure. Therefore, the above description should not be interpreted as a limitation on the present invention but merely an illustration.

The computer system 102 may include, but is not limited to, a personal computer system, mainframe computer system, workstation, image computer, parallel processor, or any other device known in the art. In general, the term "computer system" may be broadly defined to encompass any device having one or more processors, which execute instructions from a memory medium.

Program instructions 112 implementing methods such as those described herein may be transmitted over or stored on carrier medium 110. The carrier medium may be a transmission medium such as a wire, cable, or wireless transmission link. The carrier medium may also include a storage medium such as a read-only memory, a random access memory, a magnetic or optical disk, or a magnetic tape.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. An apparatus for providing format and display configuration selection of an avionics display device, comprising:
    an avionics display device, wherein the avionics display device includes at least one display area;
    a user interface device; and
    a computer control system communicatively coupled to the avionics display device and the user interface device, wherein the computer control system is configured to:
        initiate an avionics display format selection menu in the display area of the avionics display device in response to a signal received from the user interface device indicative of a user request to initiate the avionics display format selection menu, wherein the avionics display format selection menu includes an application menu area, a display configuration area, and an application configuration preview area;
        select two or more applications from the application menu area of the avionics display format selection menu for display in a multi-application avionics display of the at least one display area of the avionics display device;
        select a display configuration for the multi-application avionics display from the display configuration area of the avionics display format selection menu;
        generate a multi-application avionics display preview by displaying the two or more selected applications in a configuration defined by the selected display configuration in the application preview area of the avionics display format selection menu; and
        implement the previewed multi-application avionics display by displaying the two or more selected applications in the configuration defined by the selected display configuration in the at least one display area of the avionics display device in response to a signal received from the user interface device indicative of acceptance of the previewed multi-application avionics display, wherein the displayed two or more selected applications are configured to run simultaneously on the multi-application avionics display of the at least one display area of the avionics display device.

2. The apparatus of claim 1, wherein the avionics display device comprises at least one of a liquid crystal display (LCD) device or an organic light emitting diode (OLED) display device.

3. The apparatus of claim 1, wherein the user interface device comprises a touchscreen device.

4. The apparatus of claim 1, wherein the user interface device comprises a bezel mounted input device disposed on a bezel of the avionics display device.

5. The apparatus of claim 1, wherein the two or more applications are selectable from the application menu area of the avionics display format selection menu for display in a multi-application avionics display of the at least one display area of the avionics display device utilizing a drag and drop motion.

6. The apparatus of claim 1, wherein the two or more applications are selectable from the application menu area of the avionics display format selection menu for display in a multi-application avionics display of the at least one display area of the avionics display device utilizing at least one of a single tap motion or a double tap motion.

7. The apparatus of claim 1, wherein the two or more applications are selected from the application menu area of the avionics display format selection menu for display in a multi-application avionics display of the at least one display area of the avionics display device in response to one or more signals received from the user interface device indicative of one or more applications designated by a user input.

8. The apparatus of claim 1, wherein the display configuration for the multi-application avionics display is selectable from the display configuration area of the avionics display format selection menu utilizing at least one of a single tap motion or a double tap motion.

9. The apparatus of claim 1, wherein the selected display configuration of the display configuration area is indicated on the avionics display device via a display configuration selection indicator.

10. The apparatus of claim 1, wherein the display configuration for the multi-application avionics display is selected from the display configuration area of the avionics display format selection menu in response to one or more signals received from the user interface device indicative of a display configuration designated by a user input.

11. The apparatus of claim 1, wherein the computer control system is further configured to terminate the avionics display format selection menu upon implementation of the previewed multi-application avionics display.

12. The apparatus of claim 1, wherein the selected display configuration for the multi-application avionics display includes at least one of one pane, two panes, three panes, or four panes.

13. A method for providing format and display configuration selection of an avionics display device, comprising:

provesiding an avionics display device, wherein the avionics display device includes at least one display area, wherein the avionics display device is responsive to one or more user interface devices;

initiating an avionics display format selection menu in the at least one display area of the avionics display device, wherein the avionics display format selection menu includes an application menu area, a display configuration area, and a configuration preview area;

selecting two or more applications from the application menu area of the avionics display format selection menu for display in a multi-application avionics display of the at least one display area of the display device;

selecting a display configuration from the display configuration area of the avionics display format selection menu for utilization in the multi-application avionics display; and generating a multi-application avionics display preview by displaying the two or more selected applications in a configuration defined by the selected display configuration in the application preview area of the avionics display format selection menu, wherein the two or more selected applications are configured to run simultaneously on the multi-application avionics display of the at least one display area of the avionics display device.

14. The method of claim 13, further comprising:

implementing the previewed multi-application avionics display by displaying the two or more selected applications in the configuration defined by the selected display configuration in the at least one display area of the avionics display device in response to a signal received from the user interface device indicative of acceptance of the previewed multi-application avionics display.

15. The method of claim 13, further comprising:

terminating the avionics display format selection menu in response to one or more signals received from a user interface device.

16. The method of claim 13, wherein the one or more user interface devices comprise a touchscreen device.

17. The method of claim 13, wherein the one or more user interface devices comprise a bezel mounted input device disposed on a bezel of the avionics display device.

18. The method of claim 13, wherein the selecting two or more applications from the application menu area comprises:

selecting two or more applications from the application menu area in response to one or more input signals received from the user interface device indicative of one or more applications designated by a user input.

19. The method of claim 13, wherein the selecting two or more applications from the application menu area comprises:

selecting two or more applications from the application menu area via a drag and drop motion.

20. The method of claim 13, wherein the selecting two or more applications from the application menu area comprises:

selecting two or more applications from the application menu area via at least one of a single tap motion or a double tap motion.

21. The method of claim 13, wherein the selecting a display configuration from the display configuration area comprises:

selecting a display configuration from the display configuration area in response to one or more signals received from the user interface device indicative of a display configuration designated by a user input.

\* \* \* \* \*